United States Patent [19]

Fastelli et al.

[11] Patent Number: 5,988,755
[45] Date of Patent: *Nov. 23, 1999

[54] ASSEMBLY SYSTEM FOR METALLIC TUBULAR FRAMES FOR CHAIRS, ARMCHAIRS AND/OR BENCHES

[75] Inventors: Luisa Fastelli, Corno Di Rosazzo; Severino Chiuchiolo, Manzano, both of Italy

[73] Assignee: M.F. Metal Forniture Srl, San Giovanni Al Natisone, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 09/030,961

[22] Filed: Feb. 26, 1998

[30] Foreign Application Priority Data

Mar. 20, 1997  [IT]  Italy .............. UD97A0050

[51] Int. Cl.$^6$ ................................... A47C 7/00
[52] U.S. Cl. ................ 297/440.24; 297/440.1; 297/452.2; 297/440.18; 297/440.15
[58] Field of Search .......... 297/440.24, 440.1, 297/440.15, 440.18, 452.2

[56] References Cited

U.S. PATENT DOCUMENTS

| | | | |
|---|---|---|---|
| 2,362,567 | 11/1944 | La Rue | 297/440.24 X |
| 2,509,451 | 5/1950 | Reinholz | 297/440.24 X |
| 2,512,353 | 6/1950 | Magaldino et al. | 297/440.24 X |
| 2,694,438 | 1/1954 | Frech | 297/440.24 X |
| 3,058,777 | 10/1962 | Froedge | 297/440.24 |
| 4,435,103 | 3/1984 | Becker et al. | 297/440.1 X |
| 4,563,040 | 1/1986 | Alster | 297/440.1 |
| 4,588,227 | 5/1986 | Austin | 297/440.24 |
| 4,919,485 | 4/1990 | Guichon | 297/440.15 X |
| 5,498,054 | 3/1996 | Tomlinson | 297/440.24 X |
| 5,547,258 | 8/1996 | Lin | 297/440.24 X |
| 5,601,339 | 2/1997 | Buiani | 297/440.1 |
| 5,649,742 | 7/1997 | Liu | 297/440.24 X |

FOREIGN PATENT DOCUMENTS

| | | |
|---|---|---|
| 1 005 196 | 4/1952 | France . |
| 1 284 024 | 6/1962 | France . |

Primary Examiner—Milton Nelson, Jr.
Assistant Examiner—Rodney B. White
Attorney, Agent, or Firm—Jacobson, Price, Holman & Stern, PLLC

[57] ABSTRACT

Assembly system for tubular metallic frames (10) for chairs, armchairs and/or benches, the tubular frames (10) being able to be associated with seats, chair backs, arms, flat surfaces or other parts, padded or not, the frame (10) consisting of a plurality of base components (12) of one or more tubular elements (13), the base components (12) having a substantially two-dimensional development, each of the base components (12) integrally including respective male elements (24) or female elements (25) with a speedy pre-assembly coupling cooperating with mating female elements (25) or male elements (24) with a speedy coupling on another of the base components (12), in the pre-assembly condition, the base components (12) including, in an intermediate position on a relative tubular element (13), respective aligned holes (27) for the insertion and clamping of at least a clamping rod or bar (28).

9 Claims, 4 Drawing Sheets

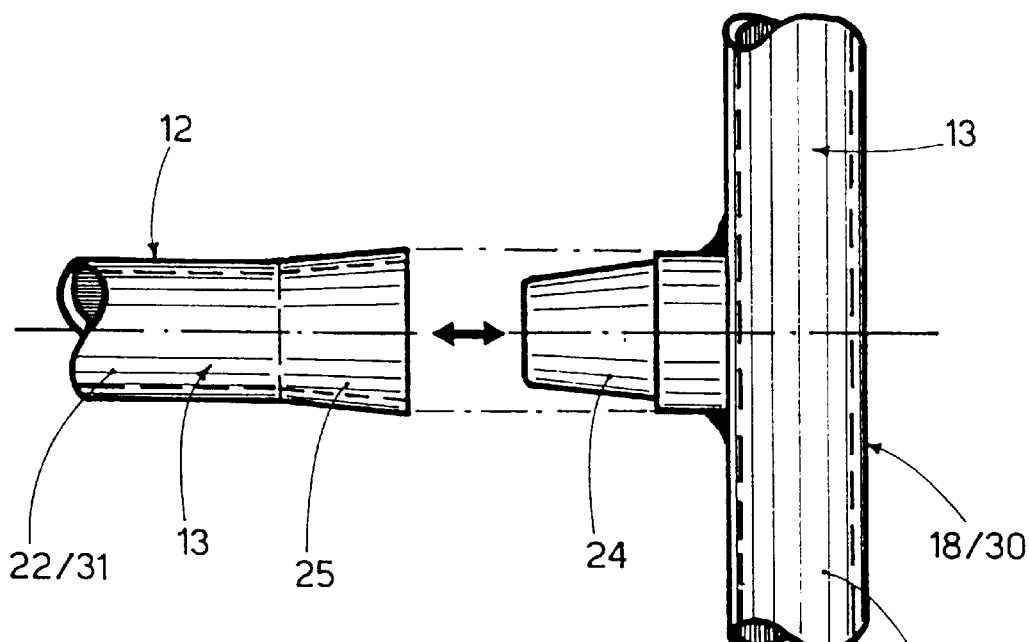
fig. 5 ("A")
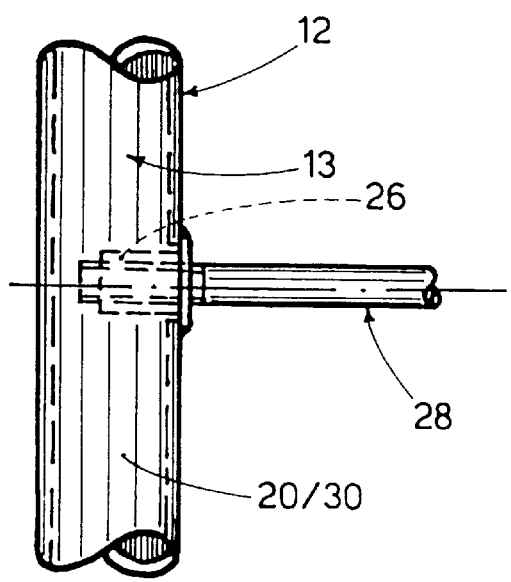
fig. 6a ("B")
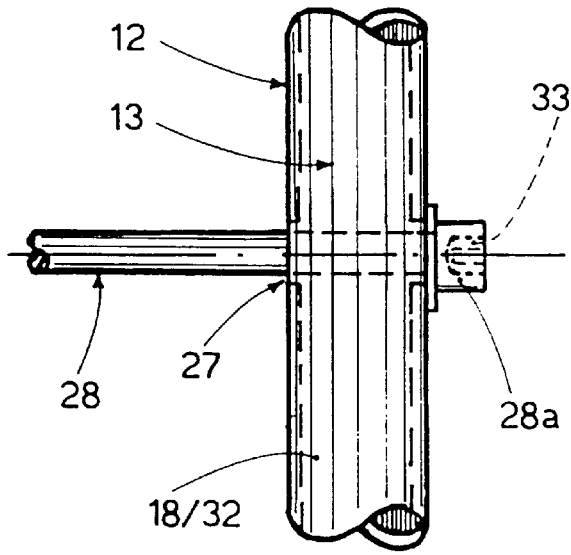
fig. 6b ("C")

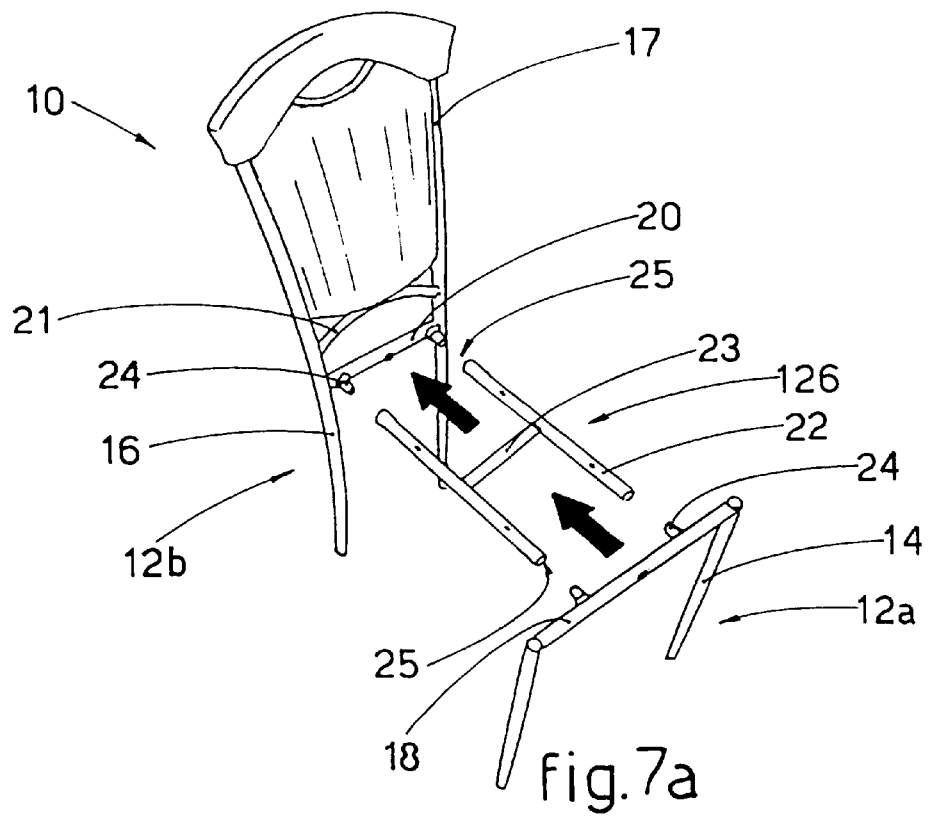
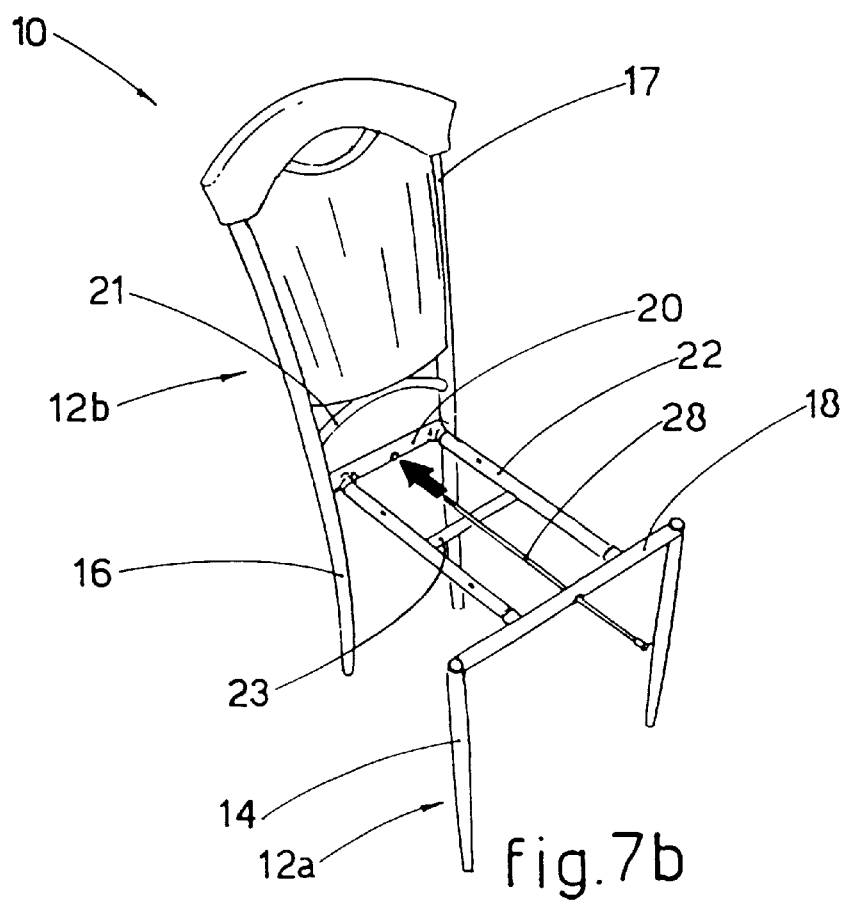

ASSEMBLY SYSTEM FOR METALLIC TUBULAR FRAMES FOR CHAIRS, ARMCHAIRS AND/OR BENCHES

This invention concerns a system to assemble metallic tubular frames for chairs, armchairs and/or benches as set forth in the main claim.

The invention is employed to assemble furnishing components with metallic tubular supporting structures.

We shall refer hereinafter, for simplification of the description, to an application of the invention to furnishing components consisting of chairs, armchairs and/or benches, but the invention can in any case be applied also to beds, tables, desks, work surfaces or other similar furnishing components.

By tubular elements, the invention intends tubes of any shape, such as round, oval, polygonal or otherwise.

The state of the art covers furnishing components for seats, such as chairs, armchairs or benches, comprising a metallic tubular supporting frame, onto which are mounted the elements of the seat and the back rest and arm rests, if any, whether they be of the rigid type or padded.

These frames normally consist of a plurality of individual tubular elements assembled together definitively by means of welding.

This assembly is performed at the step when the frame is made, and therefore the frame, when it leaves the factory, is already in its final shape, as it will be used in its final use.

This causes considerable problems in packing, storing and transporting the frames, due to their notable bulk and also to the fact that they cannot be dismantled.

It is therefore necessary to arrange packing elements and equipment of the suitable size for the finished frames; it is also necessary to provide ample storage space and means of transport which are sufficiently capacious and suitable to accommodate the desired number of frames which are to be transported.

Given the effect that transport costs have on the overall costs of such products, all this involves a considerable increase in the sales price, which makes the chairs, armchairs and benches using these frames uncompetitive.

In order to overcome these problems, systems have been proposed which employ combined attachment means of the screw/nut type; these systems however are very laborious and require a considerable number of attachment elements, and complex and difficult assembly operations.

Moreover, the assembly thus obtained is unstable, especially in the case of frames which are subjected to high strains or weights, or subject to frequent displacements.

The attachment elements which are known to the state of the art, in fact, are not anchored directly on the tubular components of the frame, but act under pressure on a reduced part of the surface thereof; this type of clamped connection is particularly likely to come loose, and subject to wear as time passes.

The present applicants have therefore designed, tested and embodied this invention, to overcome the shortcomings of the state of the art, and to provide further advantages.

The invention is set forth and characterised in the main claim, while the dependent claims describe variants of the idea of the main embodiment.

The purpose of the invention is to provide a system which allows the final assembly of metallic tubular frames for chairs, armchairs and/or benches at a time later than the production stage, thus allowing the frames to be transported in their dismantled state and therefore allowing packing means of a smaller size to be employed, and a reduction in the spaces needed for storing and transporting the said frames.

Another purpose of the invention is to provide an assembly system which is quick, safe and long-lasting, which will allow the frame to be assembled easily and at the same time will make the assembled frame solid, and highly resistant to stresses.

The assembly system according to the invention uses a plurality, albeit limited, of base structural components of a substantially two-dimensional design, which develop on a single plane and consist of one or more tubular elements possibly welded together.

During the production step, on each of the two-dimensional components mating means of reciprocal rapid coupling are provided, which are used in a first pre-assembly step.

The rapid coupling means are made in a single body with the two-dimensional components.

According to a variant, the rapid coupling means are associated with the said components by means of welding.

According to a further variant, auxiliary constraining means such as pins, screws, clips or similar, cooperate with the rapid coupling means.

The two-dimensional components also have, for example at an intermediate position on one of their tubular elements, at least one through hole in which to insert a clamping rod or bar of which at least one end is threaded.

The through holes are arranged in such a way that they are all aligned in the pre-assembly position of the frame, as defined by the rapid coupling means.

According to a variant, one end component of the frame has the dead hole associated inside with a threaded bush into which the clamping rod or bar is inserted and tightened.

According to the invention, at the moment of assembly, the two-dimensional components are first associated, in a pre-assembly stage, with each other by means of coupling of the respective rapid coupling means. Then, the clamping rod or bar is inserted and clamped, which causes the reciprocal solid clamping of the two-dimensional components of the frame.

The assembly thus achieved is extremely precise, safe and stable because of the combined action of the coupling means and the connection elements. In particular, each of the clamping rods or bars acts substantially with a direct grip on the two-dimensional components, thus guaranteeing a reciprocal solid constraint which ensures a high resistance to stresses and a tight grip.

This makes the clamping of the two-dimensional elements safe, and not subject to wear, nor will they come loose.

In a preferred embodiment of the invention, the head of the clamping rod or bar has a hexagonal cavity; with this embodiment it is possible to use hexagonal wrenches which are particularly appropriate for an easy and efficacious clamping such as will facilitate the operations to assemble/dismantle the chair or bench to which the invention is applied, and make said operations extremely quick.

In a first embodiment, the clamping rod or bar is inserted also into a hole in a transverse element arranged at an intermediate position between the two headpieces, front and rear, of the chair.

According to a variant, the clamping rod or bar is inserted only into the holes in the front and rear headpieces of the chair and clamped thereto.

The attached figures are given as a non-restrictive example and show some preferred embodiments of the invention as follows:

FIG. 5 shows the detail "A" of FIGS. 2 and 4 with the frame not assembled;

FIG. 6a shows the detail "B" of FIGS. 2 and 4;

FIG. 6b shows the detail "C" of FIGS. 2 and 4.

Figure 1:
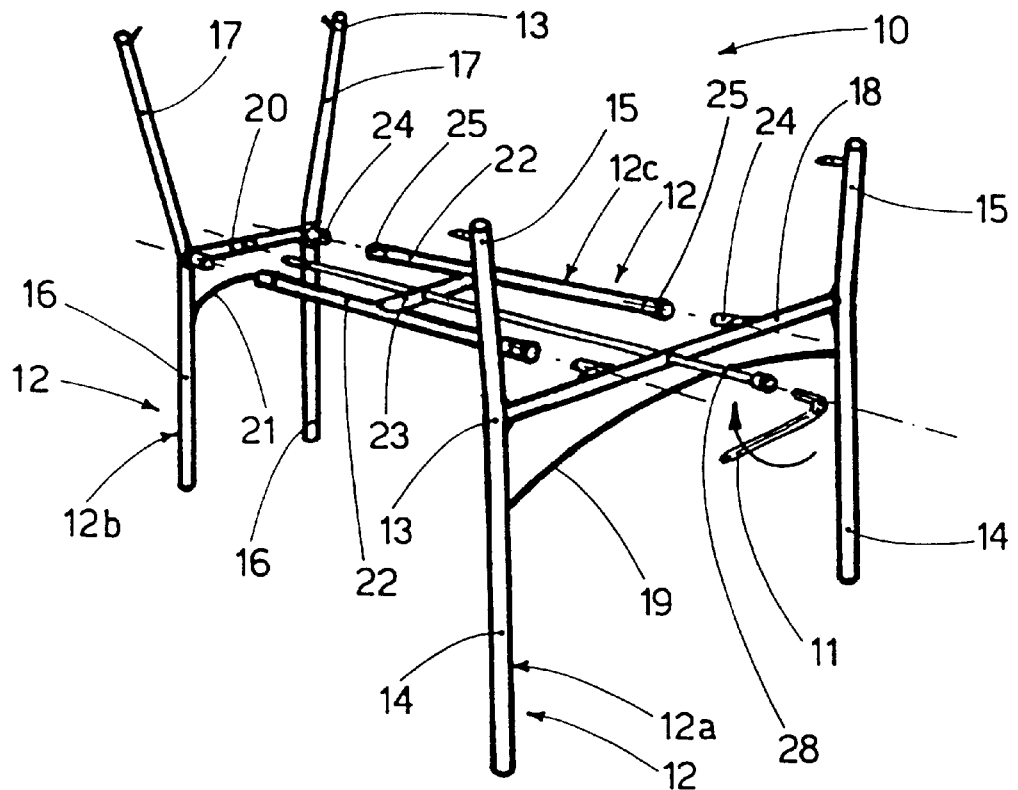
FIG. 1 shows an exploded view of the tubular frame of a chair using the assembly system according to the invention.
Figure 2:
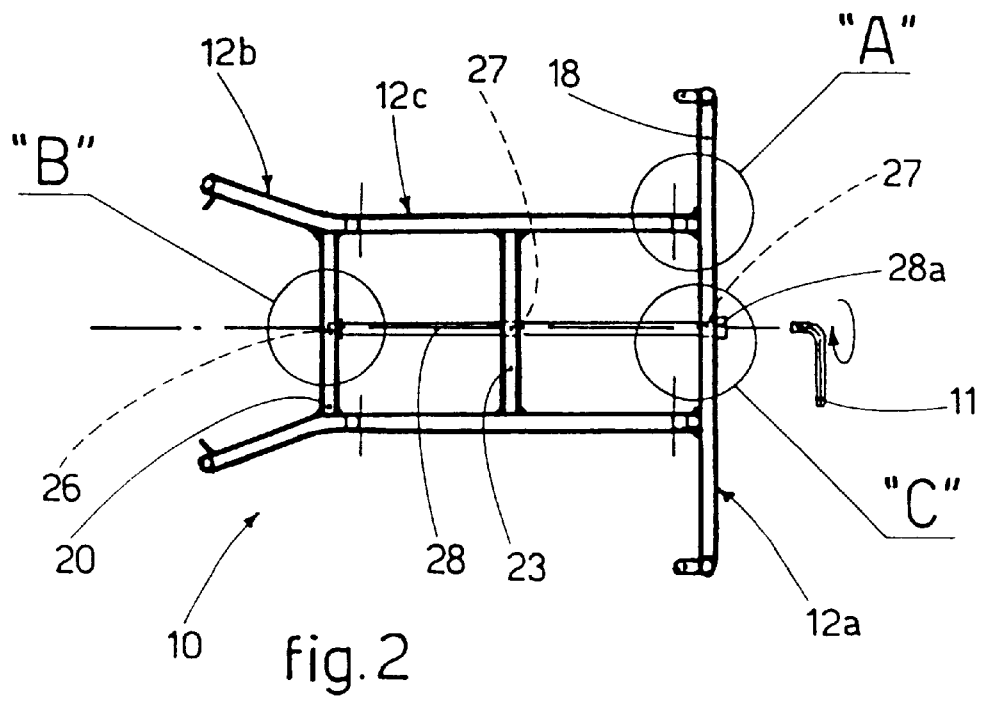
FIG. 2 shows a view from above of the tubular frame of the chair shown in FIG. 1 in its assembled state.

FIG. 7a and 7b how two assembly steps of the system according to the invention in a variant of FIGS. 1 and 2.

With reference to the attached figures, the number 10 denotes generally a metallic tubular frame for chairs, armchairs and/or benches assembled according to the invention.

The frame 10 consists of a plurality of two-dimensional components 12, developing substantially on a single plane, produced in the factory by means of welding the individual tubular elements 13.

Each of the two-dimensional components 12 has respective and mating jointing elements, which can rapidly be coupled, respectively male elements 24 and female elements 25.

FIGS. 1 and 2 show the tubular frame 10 for a chair comprising three two-dimensional components respectively front 12a, rear 12b and middle 12c.

In this case, the front component 12a comprises the front headpiece defining the front legs 14 made as a single body with the elements to support the arms 15, a cross bar 18 and a stiffening rod 19; the rear component 12b comprises the rear headpiece defining the rear legs 16 made as a single body with the elements to support the back 17, a cross bar 20 and a stiffening rod 21.

The middle component 12c constitutes the supporting structure of the seat part and comprises two longitudinal elements 22 and a transverse element 23.

At their respective ends, the two longitudinal elements 22 have female jointing elements 25, which can rapidly be coupled, and which cooperate and are aligned with respective male jointing elements 24 arranged on the front component 12a and on the rear component 12b.

In this case, the female jointing elements 25 are made as a single body with the longitudinal elements 22 and are countersunk in a cone shape, whereas the male jointing elements 24 consist of conical pins assembled by welding (FIG. 5).

The countersunk portion which defines the female jointing elements 25 may also have an internal configuration which is cylindrical, polygonal or of any other desired shape.

The connection between the female elements 25 and the male elements 24 may be made more stable and secure, in a variant, by means of applying pins, screws, clips or similar.

According to a variant which is not shown here, the female jointing elements 25 are arranged on the front 12a and rear 12b components, and the male jointing elements 24 are made at the ends of the longitudinal elements 22.

On the cross bar 18 of the front component 12a, in the case of FIGS. 1 and 2 and in this case substantially at a middle position, there is also a through hole 27 aligned with a similar through hole 27 on the transverse element 23 of the middle component 12c.

A threaded bush 26 is solidly associated with the cross bar 20 of the rear component 12b, in this case rabbeted therein, facing and aligned with the through holes 27.

In the first assembly step of the tubular frame 10, the male jointing elements 24 of the front 12a and rear 12b components are coupled with the mating female elements 25 which are present at the ends of the longitudinal elements 22.

Subsequently, a clamping rod or bar 28, threaded at the end, with a length proportionate to the assembly distance between the front component 12a and the rear component 12b, is inserted in the through holes 27 and tightened inside the threaded bush 26 until the head 28a is made to abut on the cross bar 18.

This clamps the two-dimensional components 12a, 12b, 12c in their definitive assembly position, guaranteeing a stable constraint with a good grip and a high resistance to stresses, given that the connection is guaranteed by inserting the clamping rod or bar 28.

In the variant shown in FIGS. 7a and 7b, the clamping rod or bar 28 is inserted only into the holes 27 in the front and rear headpieces of the chair, and the transverse element 23 arranged below the rod or bar 28 has a stabilising and anti-vibration function.

Figure 3:
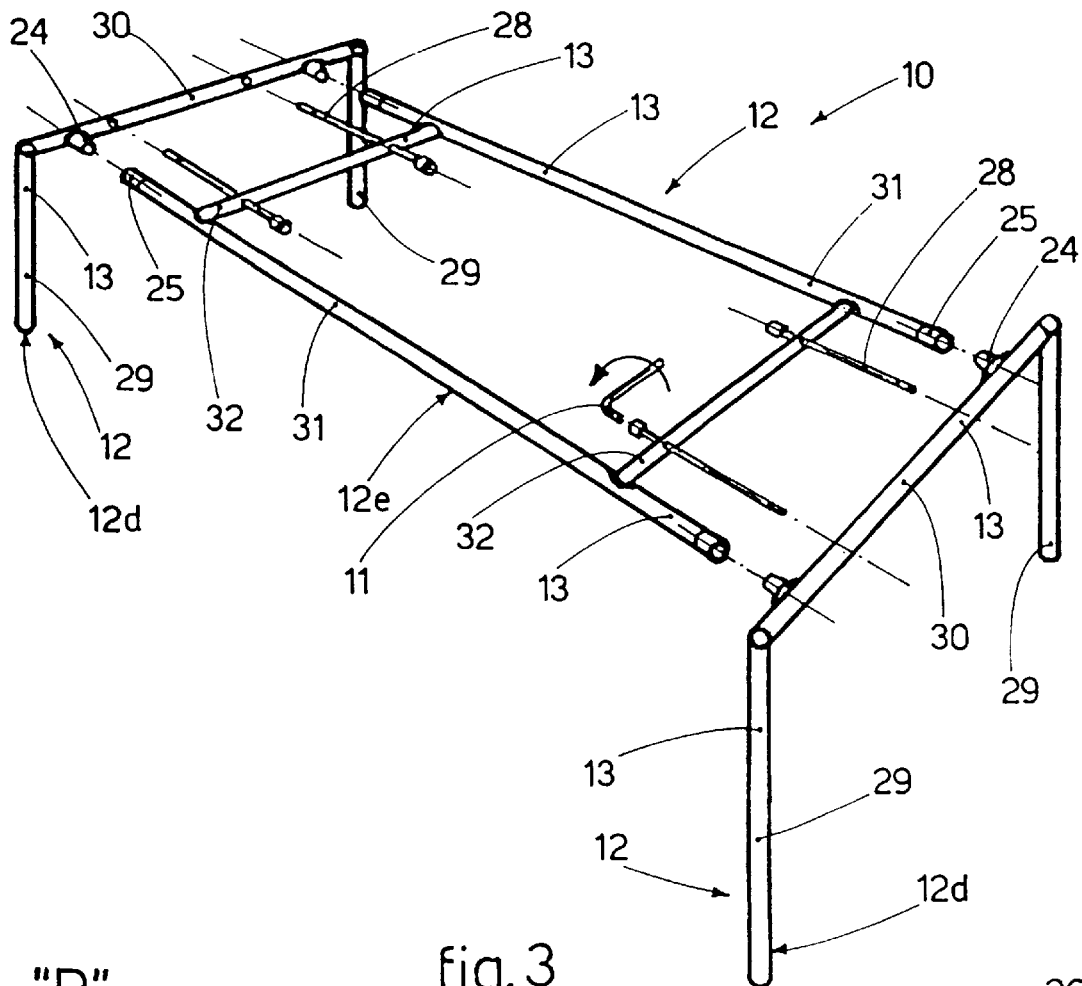
FIG. 3 shows an exploded view of the tubular frame of a bench using the assembly system according to the invention.
Figure 4:
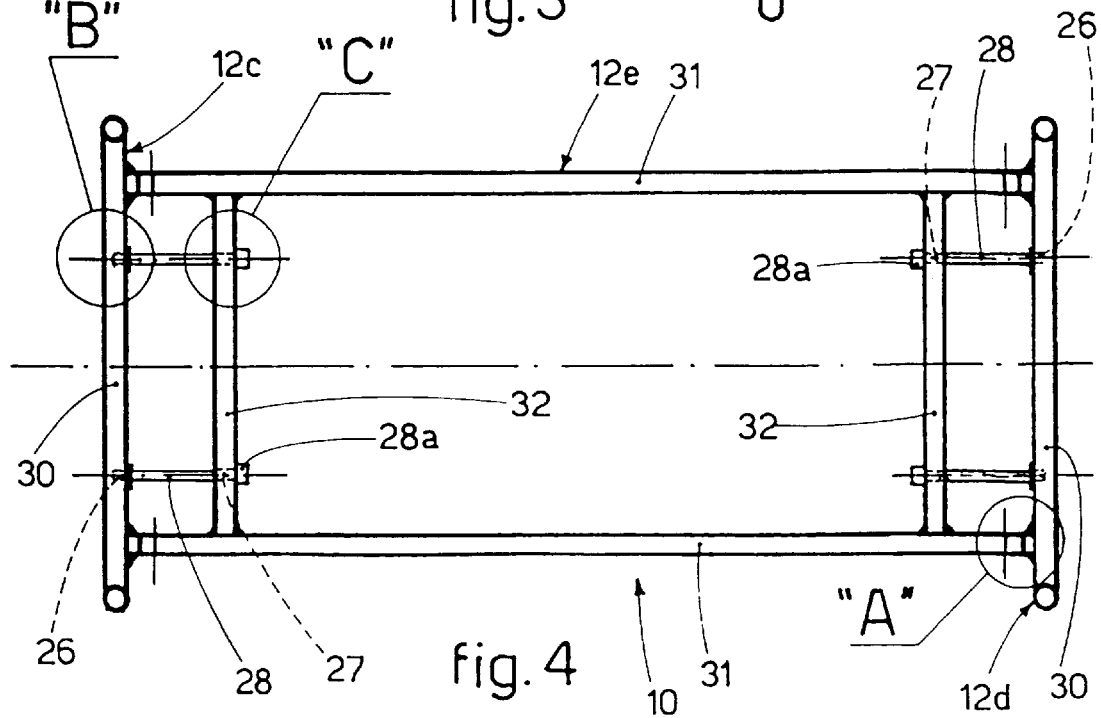
FIG. 4 shows a view from above of the tubular frame shown in FIG. 3 in its assembled state.

FIGS. 3 and 4 show a tubular frame 10 for benches consisting of two lateral components 12d and a central component 12e.

Each of the two lateral components 12d comprises legs 29 and a cross bar 30 to join the legs 29; the central component 12e constitutes the supporting structure for the seat part and comprises two longitudinal elements 31 arranged parallel to each other and spaced by two transverse elements 32.

The procedure to assemble the tubular frame 10 is the same as that used for the tubular frame 10 for chairs as shown in FIGS. 1 and 2; the male jointing elements 24 on the cross bar 30 are coupled with the female jointing elements 25 made at the ends of the longitudinal elements 31.

The components 12d and 12e are clamped by means of inserting four clamping rods 28 inside mating through holes 27 made on the transverse elements 32 and tightening them inside the four relative bushes 26 which are solidly associated with the cross bars 30.

In this case, the clamping rods 28 have a head 28a with a hexagonal cavity 33, this being advantageous in that it allows hexagonal wrenches 11 to be used, which are suitable to perform rapid and efficient clamping operations.

In this case too, the pre-assembly condition may be made more stable and secure by including constraining elements such as pins or screws which clamp the female jointing elements 25 into a definitive position with respect to the male jointing elements 24.

We claim:

1. System to assemble metallic tubular frames (10) for chairs, armchairs and/or benches, the system comprising a frame (10) consisting of a plurality of base components (12) with one or more tubular elements (13), the base components (12) being substantially two-dimensional, the base components (12) including spaced apart front and rear vertical base components (12a, 12b, 12d) and a middle horizontal base component (12c, 12e) interconnecting the front and rear vertical base components, each of the front and rear vertical base components (12a, 12b, 12d) integrally including male (24) or female (25) elements cooperating with corresponding mating female (25) or male (24) elements of the same type present on the middle horizontal base component (12c, 12e) in a pre-assembly condition, each of the front and rear vertical base components (12a, 12b, 12d) including a pair of spaced apart tubular elements (13) interconnected by a cross bar (18, 20, 30, 32), the male (24) and female (25) elements being oriented in laterally spaced relation on the cross bar (18, 20, 30, 32), the system further comprising at least one clamping rod (28) extending through and interconnecting the cross bars (18, 20, 30, 32) and spaced laterally from the tubular elements (13) in each pair and in an intermediate position with respect to the mating male (24) and female (25) elements, each cross bar (18, 20, 30, 32) including respective aligned holes (27) through which the clamping rod (28) is inserted, one of the holes of the cross bars (18, 20, 30, 32) including a threaded bush (26), the clamping rod (28) having a threaded end that threadably engages the threaded bush, the clamping rod (28) being turned, moving the base components (12a, 12b, 12d) towards each other to tighten and clamp the base components (12a, 12b, 12d, 12c, 12e) in an assembly condition.

2. System as in claim 1, in which the male elements (24) comprise pin means which extend outward with respect to the relative tubular element (13) of the base component (12).

3. System as in claim 1, in which the female elements (25) comprise a countersink on an end part of a tubular element (13) of the base component (12).

4. System as in claim 3, in which the countersink defining the female element (25) has a conical shape.

5. System as in claim 3, in which the countersink defining the female element (25) has a cylindrical shape.

6. System as in claim 5, in which the countersink defining the female element (25) has a polygonal shape.

7. System as in claim 1, in which the male elements (24) and the female elements (25) cooperate with constraining means.

8. System as in claim 7, in which the constraining means is a pin, screw or clip.

9. System as in claim 1, in which a head (28a) of the clamping rod (28) has a hexagonal cavity (33).

\* \* \* \* \*